United States Patent
Kandasamy et al.

(10) Patent No.: US 10,241,838 B2
(45) Date of Patent: Mar. 26, 2019

(54) DOMAIN BASED RESOURCE ISOLATION IN MULTI-CORE SYSTEMS

(71) Applicant: International Business Machines Corporation, Armonk, NY (US)

(72) Inventors: Madhusudanan Kandasamy, TamilNadu (IN); Pruthvi P. Nataraj, Karnataka (IN); Ranganathan Vidya, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 14/100,057

(22) Filed: Dec. 9, 2013

(65) Prior Publication Data

US 2015/0160973 A1   Jun. 11, 2015

(51) Int. Cl.
  *G06F 9/46*   (2006.01)
  *G06F 9/50*   (2006.01)

(52) U.S. Cl.
  CPC .................. *G06F 9/5061* (2013.01)

(58) Field of Classification Search
  CPC .................................................. G06F 9/4881
  See application file for complete search history.

(56) References Cited

U.S. PATENT DOCUMENTS

| | | | |
|---|---|---|---|
| 6,859,926 B1 | 2/2005 | Brenner et al. | |
| 7,086,058 B2 * | 8/2006 | Luick | G06F 1/206 |
| | | | 718/102 |
| 8,429,191 B2 | 4/2013 | Desai et al. | |
| 8,490,103 B1 | 7/2013 | Belady et al. | |
| 8,843,928 B2 * | 9/2014 | Master et al. | 718/100 |
| 8,909,950 B1 * | 12/2014 | Levchuk | H04W 52/223 |
| | | | 713/300 |
| 2005/0183084 A1 | 8/2005 | Cuomo et al. | |
| 2008/0270199 A1 | 10/2008 | Chess et al. | |
| 2009/0150650 A1 * | 6/2009 | Van der Hoeven | G06F 9/5066 |
| | | | 712/28 |
| 2009/0328047 A1 * | 12/2009 | Li | G06F 9/5033 |
| | | | 718/102 |

(Continued)

FOREIGN PATENT DOCUMENTS

| | | |
|---|---|---|
| CN | 101296114 A | 10/2008 |
| CN | 104699538 A | 6/2015 |
| GB | 2480909 A | 7/2011 |

OTHER PUBLICATIONS

Kumar, Avinesh, "Multiprocessing with the Completely Fair Scheduler", IBM, Jan. 8, 2008, retrieved from website: ibm.com/developerworks/linux/library/1-cfs/index.html>.

(Continued)

*Primary Examiner* — Camquy Truong
(74) *Attorney, Agent, or Firm* — David B. Woycechowsky (57) ABSTRACT

Embodiments of the present invention provide a system, method, and program product for domain based resource isolation in multi-core systems. A computing device determines an operation being attempted on a workload request identified with a first domain identifier. The computing device determines a processor core identified with a second domain identifier. In response to determining that processor cores identified with the second domain identifier can service workload requests identified with the first domain identifier, the computing device deploys the workload request to the processor core for servicing.

3 Claims, 6 Drawing Sheets

(56) References Cited

U.S. PATENT DOCUMENTS

| | | |
|---|---|---|
| 2010/0023948 A1 | 1/2010 | Towner |
| 2010/0131955 A1* | 5/2010 | Brent .................... G06F 9/4843 718/103 |
| 2011/0161968 A1 | 6/2011 | Bash et al. |
| 2011/0179252 A1 | 7/2011 | Master et al. |
| 2011/0302286 A1 | 12/2011 | Parolini et al. |
| 2012/0216214 A1 | 8/2012 | Flemming et al. |
| 2013/0268943 A1* | 10/2013 | Solihin ........................ 718/104 |
| 2015/0033239 A1* | 1/2015 | Heilper .................. G06F 11/34 718/105 |
| 2015/0205642 A1* | 7/2015 | Xu ........................ G06F 9/4881 718/105 |

OTHER PUBLICATIONS

IBM, "Explore New IBM PureSystems Solutions for SAP", retrieved on Jul. 18, 2013 from website: <ibm.com/ibm/puresystems/us/en/>.

\* cited by examiner

DOMAIN BASED RESOURCE ISOLATION IN MULTI-CORE SYSTEMS

BACKGROUND

The present disclosure relates generally to the field of multi-core processing systems, and more particularly to workload request distribution in multiprocessing systems.

A key task of an operating system is to allocate hardware resources like processor cycles and memory to all applications. Typically, applications receive more or less equal share of resources. In certain instances, it is desirable to give few applications prioritized access to resources over others, such as to meet desired quality of service. In other instances, it is desirable to limit the resource consumed by applications, such as to avoid denial of service attacks.

General purpose operating systems meet these goals in different ways. One solution supports the concept of per-process priority and limits. Another solution groups tasks by an arbitrary attribute, such as userID, and impose limits on the resource consumed by all the tasks of a group. Managing resource allocation to a group of tasks, rather than to individual tasks, entails increased flexibility and manageability from an administrative point of view. An additional solution provides resource isolation to objects, such as volume groups, file systems, and files. Hence, resource isolation provides restrictions on use or access to objects; however, such isolation does not extend to processors.

SUMMARY

Embodiments of the present invention provide a system, method, and program product for domain based resource isolation in multi-core systems. A computing device determines an operation being attempted on a workload request identified with a first domain identifier. The computing device determines a processor core identified with a second domain identifier. In response to determining that processor cores identified with the second domain identifier can service workload requests identified with the first domain identifier, the computing device deploys the workload request to the processor core for servicing.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

A key task of an operating system is to allocate hardware resources like processor cycles and memory to all applications. Typically, applications receive more or less equal share of resources. In certain instances, it is desirable to give few applications prioritized access to resources over others, such as to meet desired quality of service. In other instances, it is desirable to limit the resource consumed by applications, such as to avoid denial of service attacks.

In instances where users run a plurality of differing transactions, each user may need independent processor loads and predetermined workload optimization. Embodiments of the current invention seek to utilize resource isolation to address the aforementioned processor load and workload optimization issues. Specifically, embodiments of the current invention use domains to provide resource isolation to processor cores. In an embodiment, domains are tags that group processor cores based on predetermined performance criteria and/or predetermined workload patterns.

Figure 1A:
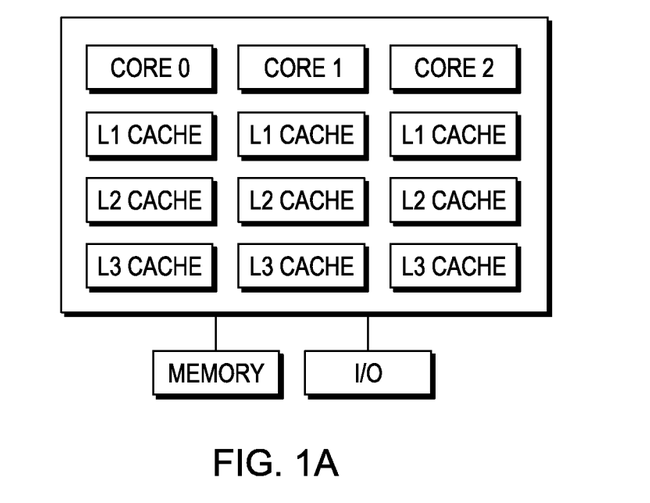
FIG. 1A depicts an exemplary multi-core system, in accordance with an embodiment of the present invention.

Embodiments of the present invention will now be described in detail with reference to the Figures. FIG. 1A depicts an exemplary multi-core system, in accordance with an embodiment of the present invention. The multi-core system includes cores 0, 1, and 2, each having associated L1, L2, and L3 caches, that are in communication with memory blocks and I/O devices, such as disk drives, keyboards, monitors, printers, modems, and network cards. One of the advantages of a multi-core system is the ability to execute multiple instructions at the same time, which can improve system performance. Although the exemplary multi-core system of FIG. 1A includes three (3) cores, other exemplary multi-core systems may include more or less cores as well as a different cache circuitry.

Figure 1B:
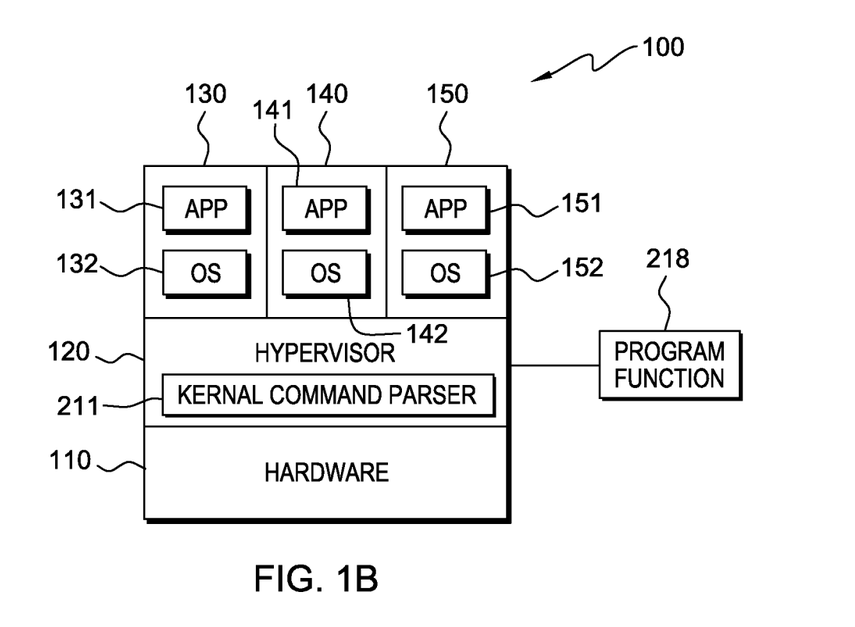
FIG. 1B depicts an environment, in accordance with an embodiment of the present invention.

FIG. 1B depicts a virtualization system, generally 100, in accordance with an embodiment of the present invention. Virtualization system 100 is a system wherein virtual machines are generated that act like physical computing devices with an operating system. Software executed on virtual machine is separated from the underlying resources. In hardware virtualization, the host machine is the actual physical machine on which the virtualization takes place and the guest machine is the virtual machine. The terms host and guest are used to distinguish the software that runs on the physical machine from the software that runs on the virtual machine.

Specifically, virtualization system 100 includes hardware layer 110, hypervisor layer 120, and virtual machines 130, 140, and 150, in accordance with an embodiment of the present invention. Hardware layer 110 includes a multi-core processor, such as the multi-core processor depicted in FIG. 1A, memory, and I/O devices, such as storage devices and network cards. Hypervisor layer 120 provides an interface between hardware layer 110 and virtual machines 130, 140, and 150. Hypervisor layer 120 is in communication with program function 218, which is software that allocates workload patterns to processor cores that are grouped by domain. Program function 120 can deploy workloads to appropriate processor cores for servicing (discussed in further detail below in reference to FIG. 2). Hypervisor layer 120 includes command parser 119, which 211 represents executing code that parses commands/instructions initiated in user space of the machine hosting the hypervisor layer 120 (discussed in further detail below in reference to FIG. 2). Hypervisor layer 120 can manage virtualization within virtualization system 100, which includes, for example, creating logical partitioning and dynamically moving resources across multiple operating systems.

Figure 1C:
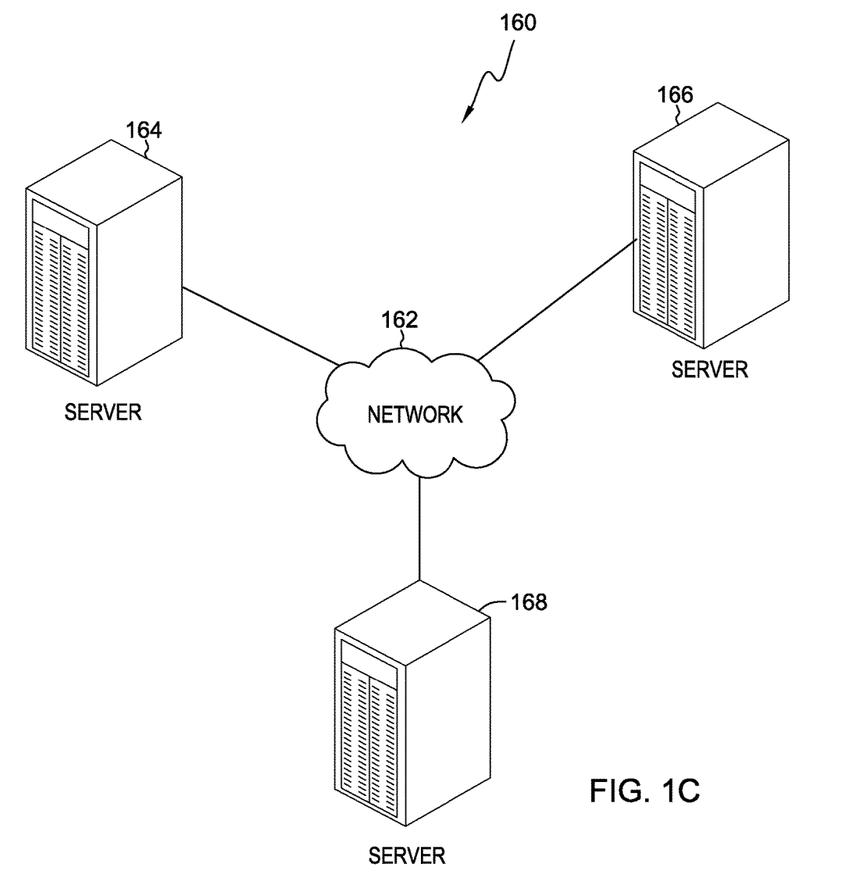
FIG. 1C, depicts an environment, in accordance with an embodiment of the present invention.

Specifically, hypervisor layer 120 can divide the resources that are included in hardware layer 110 into logical partitions within a storage device, such as a storage device that is included in external device(s) 418. Each logical partition includes a virtual machine (hereinafter "VM") that operates like an independent system running its own operating system. VMs 130, 140, and 150 are generated by hypervisor layer 120 as logical partitions in, for example, a storage device that is included in external device(s) 418 of FIG. 4. VMs 130, 140 and 150 include operating systems 132, 142, and 152, which are running applications 131, 141, and 151, respectively. In an embodiment, VMs 130, 140, and 150 include additional applications than depicted herein. Applications 131, 141, and 151 can be any application that supports an embodiment of the present invention FIG. 1C depicts an environment, generally 160, in accordance with an embodiment of the present invention. Environment 160 includes servers 164, 166, and 168, all interconnected over network 162. Network 162 can be, for example, a local area network (LAN), a wide area network (WAN) such as the Internet, or a combination of the two, and can include wired, wireless, or fiber optic connections. In general, network 162 can be any combination of connections and protocols that will support communications between servers 164, 166, and 168. In various embodiments of the present invention, servers 164, 166, and 168 may be a laptop computer, tablet computer, netbook computer, personal computer (PC), a desktop computer, a personal digital assistant (PDA), a smart phone, or any programmable electronic device capable of communicating with other computing devices via network 162.

Although not shown, environment 160 can include virtual machines and/or additional computing devices, such as client computing devices. In other embodiments, server 164, 166, and/or 168 is an application server. In still other embodiments, servers 164, 166, and/or 168 include a multicore processor, such as the multicore processor of FIG. 1A. In another embodiment, servers 164, 166, and/or 168 include a virtualization system, such as virtualization system 100. Defining a domain can comprise establishing an identifier for a domain, such as a domain name and unique numerical identifier, and a description of the domain. A system that hosts a repository of domains can enforce uniqueness of domain identifiers as unique names and/or generate unique numbers for domains across a node or network.

Figure 1D:
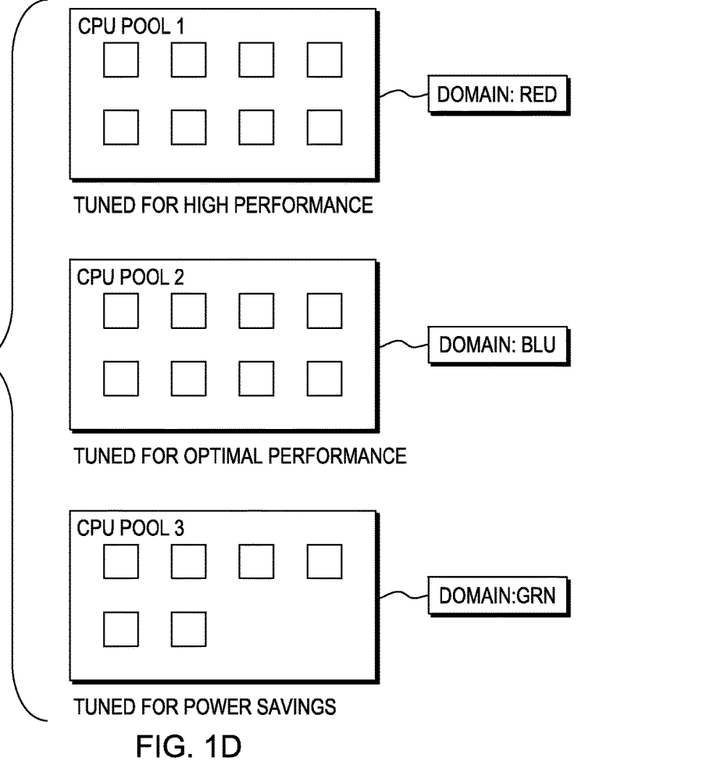
FIG. 1D depicts an exemplary illustration of CPU pools, in accordance with an embodiment of the present invention.
Figure 1E:
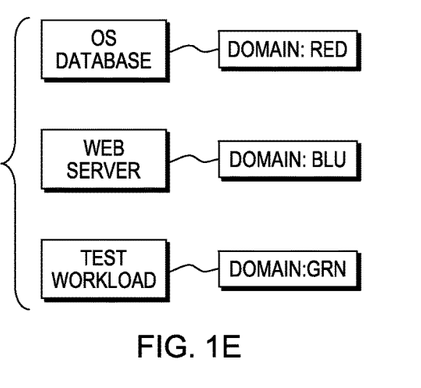
FIG. 1E depicts an exemplary illustration of workload-domain isolations, in accordance with an embodiment of the present invention.

FIG. 1D depicts an exemplary illustration of CPU pools, in accordance with an embodiment of the present invention. Specifically, FIG. 1D depicts predetermined CPU pools 1, 2, and 3, which include CPU cores that are included in environment 160, such as the CPU cores of servers 164, 166, and 168. Each CPU pool includes CPU cores that are specifically tuned for a particular performance level. For example, CPU pools 1, 2, and 3 are tuned for high performance, optimal performance, and power savings, respectively. A domain can be defined for each CPU pool. For example, CPU pools 1, 2, and 3 are associated with domains RED, BLU, and GRN, respectively. CPU pools can be associated with more than one domain. In the same vein, workloads can also be grouped by type and domain. FIG. 1E depicts an exemplary illustration of workload-domain isolations, in accordance with an embodiment of the present invention.

For example, workloads emanating from operating systems and databases can be assigned to the RED domain; workloads emanating from web servers can be assigned to the BLU domain; and workloads that are test loads can be assigned to the GRN domain.

Figure 2:
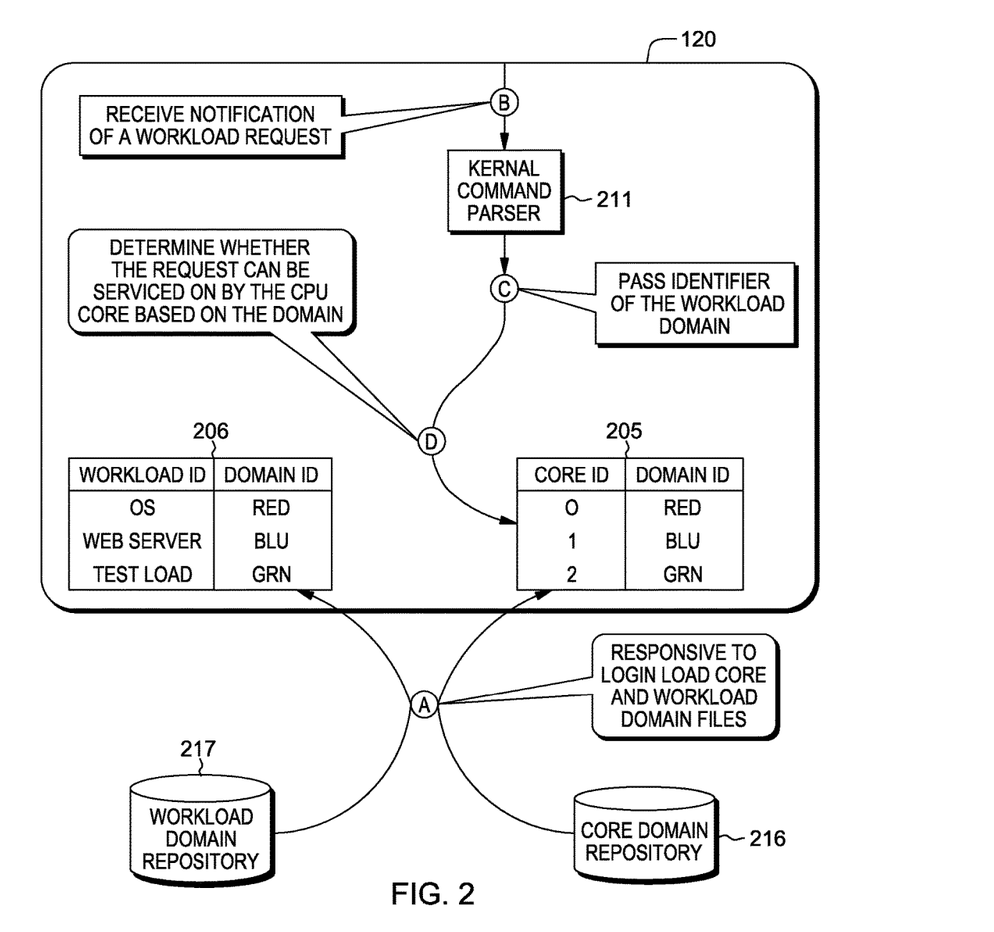
FIG. 2 depicts an exemplary diagram of domain-based workload isolation enforced in a kernel space, in accordance with an embodiment of the present invention.

FIG. 2 depicts an example concept diagram of domain based isolation enforced in hypervisor layer 120, in accordance with one embodiment of the present invention. Multicore processors can support the execution of simultaneous multiple independent threads, which increases the efficacy of resource allocation. The independent threads may be initiated by an application process, such as an operating system process, a tool process, a command process, and utility process. However, restricting cores into domains based on predetermined logic can further increase the efficacy of resource allocation.

As discussed above in reference to FIG. 1E, workloads may be partitioned into domains. Hypervisor layer 120, for example, can evaluate the set of rules that specify which domains facilitate access to which workloads and cores. When a process or subject attempts to perform an operation on a workload, such as instructions that are associated with a database, hypervisor layer 120 evaluates the domain associated with the workload, and consequently the workload is transferred to the appropriate core.

FIG. 2 depicts an exemplary diagram of domain-based isolation enforced in a kernel space, in accordance with an embodiment of the present invention. Hypervisor layer 120 can be associated with server 164, 166, or 168. Although kernel command parser 211 is not necessarily involved in receiving a command or instruction from user space, FIG. 2 depicts an example involving a command parser to avoid encumbering the description with alternatives.

The machine that hosts hypervisor layer 120 has access to core domain repository 216 and workload domain repository 217. Although shown separately, core domain repository 216 and workload domain repository 217 may be included in the same device. Core domain repository 216 comprises domain isolation rules that indicate which domains are associated with which processors cores. Workload domain repository 217 comprises domain isolation rules that indicate which domains are associated with which workloads. Defining a domain isolation rule comprises indicting an item, such workload or core, and a domain(s) that facilitates performance of operation on the item.

Defining a rule can also comprise specifying a domain that does not facilitate performance of an operation on the item. A storage device that hosts core domain repository 216 and/or workload domain repositories 217 can be local or remote with respect to the machine that hypervisor 120. Core and workload domain isolation rules 205 and 206 are loaded in hypervisor layer 120 from core domain repository 216 and workload domain repository 217, respectively, at stage A. Although embodiments can load all of the domain isolation rules into hypervisor layer 120, embodiments can also limit loading to a subset of the rules.

At a stage B, program function 218 receives notification of a workload request. For example, server 164 may initiate a particular database query. At stage C, program function 218 requests an identifier of the domain targeted by the workload request from kernel command parser 211. For instance, the command parser 211 can call a function that implements program function 218 with the workload domain passed as a parameter. As another example, the kernel command parser 211 can receive a message through a system call which indicates the domain identifier to program function 218.

At stage D, program function 218 determines whether the request can be serviced by a core included in server 164, 166, and/or 168 based on a domain that is associated with the workload request. Program function 218 accesses core and domain isolation rules 205 and 206, respectively. Core domain isolation rules 205, which are predefines rules that may be set by a user, at least indicate core ID and domain ID. Workload domain isolation rules 206 at least indicate workload ID and domain ID. If program function 218 determines that a workload domain is not associated with a core included in server 164, program function 218 determines whether an alternative core is available in server 164 and/or environment 160 and passes the request to the alternative core if available.

If program function 218 determines that an alternative core is not available in server 164 and/or environment 160, program function 218 generates a notification of the determination, for example, for display to the user. If program function 218 determines that a workload domain is associated with a core controlled by hypervisor layer 110, program function 218 passes the workload request to the appropriate core.

Figure 3:
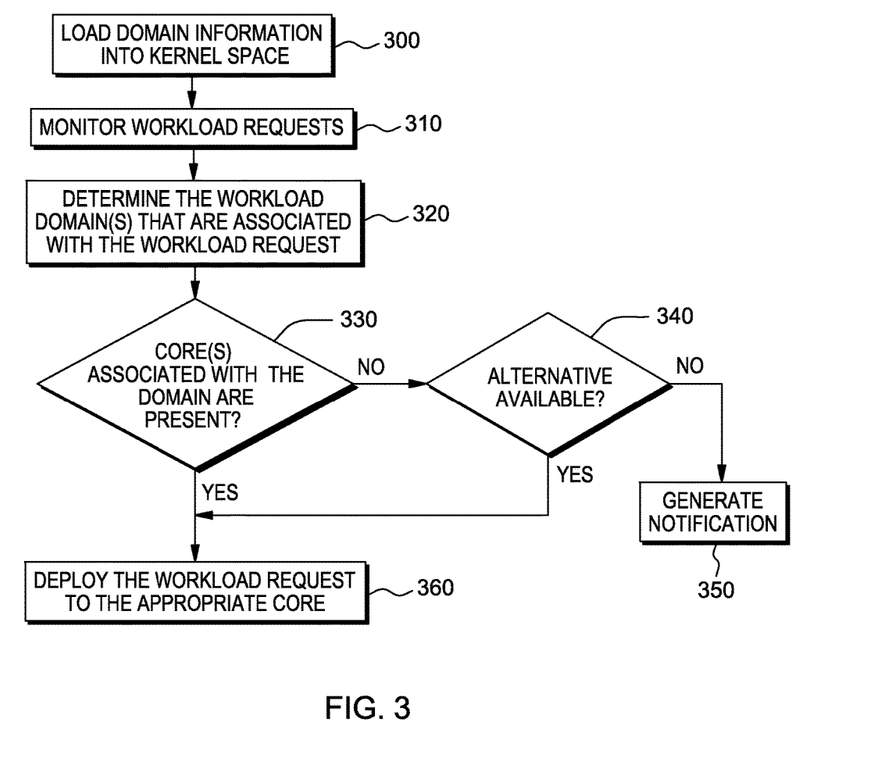
FIG. 3 is a flowchart depicting the operational steps of a program function, in accordance with an embodiment of the present invention.

FIG. 3 is a flowchart depicting operational steps of program function 218 for optimal distribution of workload requests to multiple computer processors, in accordance with an embodiment of the present invention. Program function 218 loads domain information into hypervisor layer 120 (step 300). Program function 218 monitors workload requests (step 310). Program function 218 determines the workload domain(s) that are associated with the workload request (step 320). Program function 218 determines whether core(s) associated with the domain are available/present (decisional 330). If program function 218 determines that core(s) associated with the domain are available/present ("yes" branch decisional 330), then program function 218 deploys the workload request to the appropriate core (step 360).

If program function 218 determines that core(s) associated with the domain are not available/present ("yes" branch decisional 330), then program function 218 determines whether alternative cores are available (decisional 340). For example, one or more cores may be selected as default cores to execute workload requests having no associated domains. If program function 218 determines that alternative cores are available ("yes" branch decisional 340), then program function 218 deploys the workload to the appropriate core reflecting such for the user (step 360). If program function 218 determines that alternative cores are not available ("no" branch decisional 340), then program function 218 generates a notification (step 350).

Figure 4:
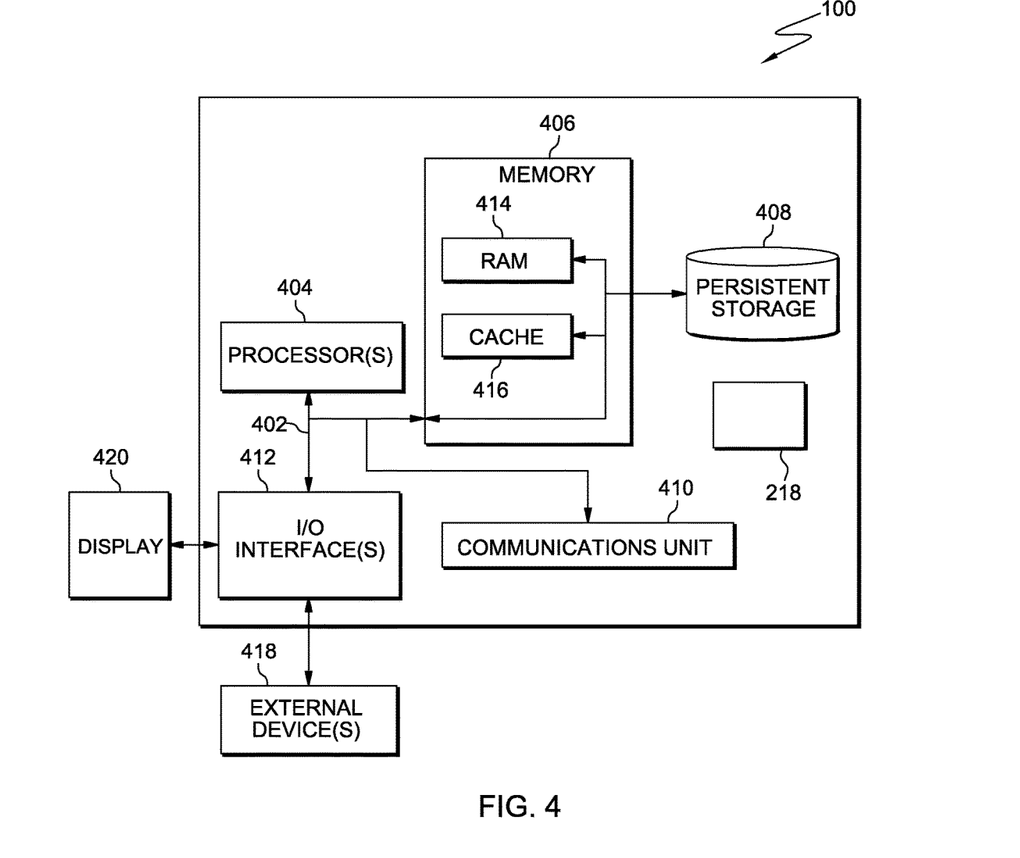
FIG. 4 depicts a block diagram of components of the virtualization system, in accordance with an embodiment of the present invention.

FIG. 4 depicts a block diagram of components of server 164, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 164 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Program function 218, kernel command parser 211, core domain isolation rules 205, and workload isolation rules 206 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program function 218 and kernel command parser 211 may be downloaded to persistent storage 408 through communications unit 410.

I/O interface(s) 412 allows for input and output of data with other devices that may be connected to server 164. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., program function 218 and kernel command parser 211, can be stored on such portable computer-readable storage media and can be loaded onto persistent storage 408 via I/O interface(s) 412. I/O interface(s) 412 also connects to a display 420. Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
receiving a plurality of workload patterns, with each workload pattern including a set of attributes that are exhibited by workloads matching the workload pattern;
for each given processor core of a plurality of processor cores, associating the given processor core with a workload pattern of the plurality of workload patterns with the association between each given processor and workloads having the attributes specified in the associated workload pattern being based upon: (i) power required by the workload, and (ii) power consumed by operation workloads having attributes specified by the associated workload pattern;
receiving a plurality of workloads;
for each given workload, determining that a matching workload pattern of the plurality of workload patterns matches the given workload;
for each given workload, responsive to the determination of the matching workload pattern for the given workload, determining a matching processor core that is associated with the matching workload pattern; and
for each given workload, performing the given workload on the matching processor core.

2. A computer program product (CPP) comprising:
a non-transitory storage medium; and
computer code stored on the non-transitory storage medium, with the computer code including instructions and data for causing a computer system to perform at least the following operations:

receiving a plurality of workload patterns, with each workload pattern including a set of attributes that are exhibited by workloads matching the workload pattern, for each given processor core of a plurality of processor cores, associating the given processor core with a workload pattern of the plurality of workload patterns with the association between each given processor and workloads having the attributes specified in the associated workload pattern being based upon: (i) power required by the workload, and (ii) power consumed by operation workloads having attributes specified by the associated workload pattern, receiving a plurality of workloads, for each given workload, determining that a matching workload pattern of the plurality of workload patterns matches the given workload, for each given workload, responsive to the determination of the matching workload pattern for the given workload, determining a matching processor core that is associated with the matching workload pattern, and for each given workload, performing the given workload on the matching processor core.

3. A computer system (CS) comprising:

a set of computer(s);

a non-transitory storage medium; and computer code stored on the non-transitory storage medium, with the computer code including instructions and data for causing the set of computer(s) to perform at least the following operations:

receiving a plurality of workload patterns, with each workload pattern including a set of attributes that are exhibited by workloads matching the workload pattern, for each given processor core of a plurality of processor cores, associating the given processor core with a workload pattern of the plurality of workload patterns with the association between each given processor and workloads having the attributes specified in the associated workload pattern being based upon: (i) power required by the workload, and (ii) power consumed by operation workloads having attributes specified by the associated workload pattern, receiving a plurality of workloads, for each given workload, determining that a matching workload pattern of the plurality of workload patterns matches the given workload, for each given workload, responsive to the determination of the matching workload pattern for the given workload, determining a matching processor core that is associated with the matching workload pattern, and for each given workload, performing the given workload on the matching processor core.

* * * * *